July 12, 1960 E. R. PARSE ET AL 2,944,279
DEPTH FINDER FOR FISHERMEN
Filed May 28, 1958
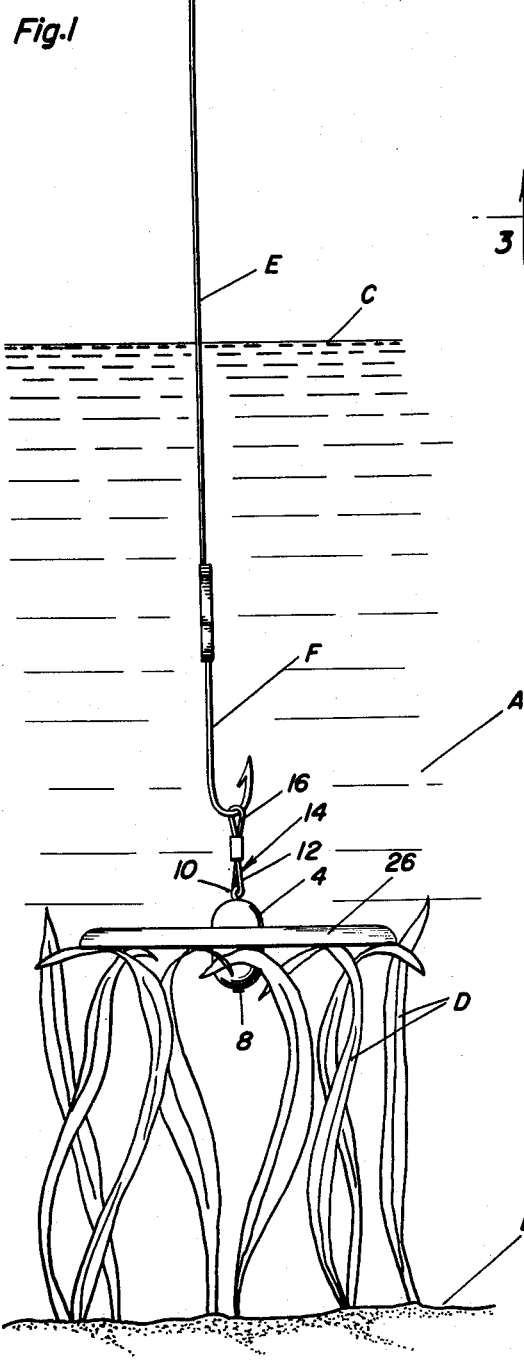
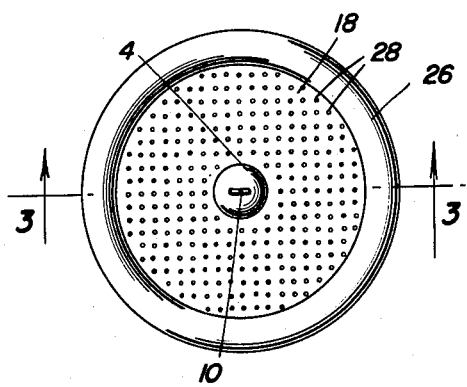
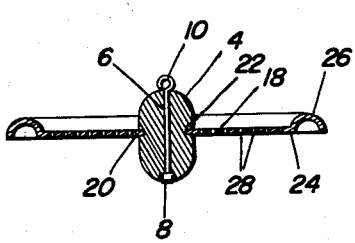
Eugene R. Parse
Claude J. Parse
INVENTORS United States Patent Office 2,944,279
Patented July 12, 1960

2,944,279

DEPTH FINDER FOR FISHERMEN

Eugene R. Parse, Rte. 1, Box 548, and Claude J. Parse, Rte. 4, Box 219, both of Waupaca, Wis.

Filed May 28, 1958, Ser. No. 738,522

2 Claims. (Cl. 16—1)

The present invention relates to an improved depth finder which is such in construction that it may be attached to and suspended from a conventional hook on a fishing line.

An object of the invention is to improve upon similarly constructed and performing sounding and depth finding devices characterized by a weight which is lowered into the water by a line. To this end the weight is provided with a perforated plate having a marginal channel-shaped rim whereby to provide a construction which may be effectually lowered into the water and which will land more effectually on the water's bottom or, as is often necessary, atop plants and similar growth that might otherwise interfere with or cause the fishhook to snag and interfere with retrieving the device.

Features and advantages not apparent from the above will become apparent from the description when read in conjunction with the accompanying drawing.

In the drawing:

Fig. 1 is an elevational view of the depth finder and showing how it may be suspended from an ordinary fishhook and thus used.

Fig. 2 is a top plan view with the fishhook and line omitted.

Fig. 3 is a section on the line 3—3 of Fig. 2.

In the drawing (Fig. 1) the body of water, the depth of which is to be measured is denoted at A, the bottom at B, the surface C and, to aid in illustrating the invention and its use, plants or the like are denoted at D. The regular fishing line E is provided with a conventional fishing hook F.

The invention itself is characterized by a sinker or weight 4 of appropriate shape and mass. A rod or stem 6 is embedded or otherwise mounted axially in the weight with the head end 8 anchored as seen in Fig. 3 and with the upper end provided with an eye to which the lower loop 12 on the swivel 14 is connected. The upper loop 16 serves to accommodate the fishhook F making it possible to support the weight by way of the swivel from an ordinarily hook-equipped fishing line. The diaphragm or plate 18, which serves as a stabilizer and self-levelling device, is of suitable material and preferably flat and disk-like in plan and the inner apertured hub portion 20 provides a flange which, as is shown in Fig. 3, is keyed in an endless groove or channel 22 at the approximate median portion of the weight. The half-portion of the weight above the groove projects to a plane above the plate and the other half-portion depends in a manner below the plane of the plate. The outer marginal edge 24 of the plate is provided with an inverted rim which is endless and channel-shaped in cross-section and denoted at 26. This rim assists in floating the plate downwardly and also assists in causing the plate to stay reasonably well level, and to rest atop the plants or other growth, debris or the like at the water's bottom B.

It will be obvious that the diameter of the weighted plate may be of any reasonable degree. Experimental models which have proved to be satisfactory and effective in use have used a plate just about 2½ inches in diameter. Such a plate works very well. Also a perforated plate, perforations denoted at 28 allows the water to pass and circulate through the perforations or holes and facilitates satisfactory coming to rest of the plate on top of weeds, mud or marl and facilitates furnishing the fisherman or user a true depth gauge at all times. This invention has been found to be highly satisfactory for ice fishing or lake fishing. It is within the purview of the invention to provide a plate with a rolled marginal edge or bead to add to buoyancy or to attach a separate imperforate annular channel to the edge 24 as shown in the drawing.

Changes in shape, size, materials and rearrangement of components may be resorted to in actual practice without departing from the spirit of the invention or the scope of the invention as claimed.

What is claimed as new is as follows:

1. A depth measuring device for use by a fisherman comprising a disk-like perforated plate provided around its outer marginal edge with an inverted endless imperforate channel-shaped rim, said plate being centrally provided with a hole, the marginal edge of the hole providing an attaching flange, and a relatively heavy weight of generally cylindrical cross-sectional form fitted through said hole and having its median portion provided with a channel-like groove, said flange being keyed in said groove, said weight being vertically elongated and having an upper half-portion projecting to a plane above the plane of the plate and a corresponding lower half-portion depending below the bottom plane of said plate, and means carried by said weight and having an eye accessible at the upper end of the weight, said eye being adapted to accommodate a swivel for a fishing line.

2. For use by a fisherman in measuring and ascertaining the depth of a body of water to be fished, a weight of requisite cross-section and size as well as mass, said weight being provided at its upper end with an eye, a swivel attached to said eye, said swivel being provided at its upper end with a loop, said loop adapting the swivel for separable attachment to a conventional fish hook at the bottom of a fishing line, a generally flat plate having a body portion which is perforated, said plate being circular in plan and being provided centrally with a hole, the marginel edge of said hole providing an attaching flange for a weight, said weight being vertically elongated and having a median portion provided with an encircling groove, said median portion of the weight being located in said hole and the flange being fitted and secured in said groove, said groove serving to divide the weight into upper and lower half-portions, the upper half-portion projecting prependicularly above the top of the plate and the lower half-portion depending perpendicularly below the bottom of the plate, the outer marginal edge of said plate being provided with an inverted endless imperforate rim channel shaped in cross-section.

References Cited in the file of this patent

UNITED STATES PATENTS

| | | |
|---|---|---|
| 792,869 | Wolff | June 20, 1905 |
| 1,493,489 | Holzapfel | May 13, 1924 |
| 2,841,916 | Ueda | July 8, 1958 |